US009001393B2

(12) United States Patent  
Shibutani et al.

(10) Patent No.: US 9,001,393 B2  
(45) Date of Patent: Apr. 7, 2015

(54) PROGRAM FOR READING CHARACTERS, AND CHARACTER READER AS WELL AS METHOD FOR READING CHARACTERS

(71) Applicant: OMRON Corporation, Kyoto-Shi, Kyoto (JP)

(72) Inventors: Naoki Shibutani, Kyoto (JP); Keiichi Tamai, Kyoto (JP); Kenichi Ukai, Shiga (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/372,836

(22) PCT Filed: Feb. 4, 2013

(86) PCT No.: PCT/JP2013/052453  
§ 371 (c)(1),  
(2) Date: Jul. 17, 2014

(87) PCT Pub. No.: WO2013/118672  
PCT Pub. Date: Aug. 15, 2013

(65) Prior Publication Data  
US 2014/0355076 A1 Dec. 4, 2014

(30) Foreign Application Priority Data  
Feb. 6, 2012 (JP) .................................. 2012-022950

(51) Int. Cl.  
*H04N 1/04* (2006.01)  
*G06K 9/62* (2006.01)  
(Continued)

(52) U.S. Cl.  
CPC .............. *G06K 9/6215* (2013.01); *G06K 9/344* (2013.01); *G06K 9/22* (2013.01); *G06K 9/723* (2013.01); *H04N 1/00251* (2013.01)

(58) Field of Classification Search  
CPC ................... G06F 17/30256; G06F 17/30277; G06F 17/30023; G06F 17/30817; G06K 9/00; G06K 9/2054; G06K 9/3266; G06K 9/00664; G06K 9/22; G06K 9/3258; G06K 9/344; G06K 9/6215  
USPC .......... 382/176, 306, 309, 104, 182, 184, 218, 382/321; 386/241, E5.017, 245, 316, 323, 386/328, 344, 355; 707/769, E17.03, 723, 707/754; 348/468; 358/1.18, 473; 701/468; G9B/20.014, 27.036  
See application file for complete search history.

(56) References Cited

U.S. PATENT DOCUMENTS 7,086,595 B2 * 8/2006 Zhu et al. ................. 235/462.09  
7,659,915 B2 * 2/2010 Kurzweil et al. ............. 345/698  
(Continued)

FOREIGN PATENT DOCUMENTS

JP 2004-199141 A 7/2004  
JP 2008-250818 A 10/2008  
(Continued)

OTHER PUBLICATIONS  
International Search Report for corresponding International Application No. PCT/JP2013/052453, mailed Apr. 2, 2013 (4 pages).

*Primary Examiner* — Negussie Worku  
(74) *Attorney, Agent, or Firm* — Osha Liang LLP

(57) ABSTRACT

A character reading method performed by a computer connected to an imaging unit includes repeating processing of recognizing the character included in one-frame image input latest in parallel to input of the moving image, performing matching of a recognition result obtained by every piece of recognition processing in units of characters along a time axis, fixing the recognition result appearing with an appearance ratio larger than a reference value previously decided in the recognition processing continuously performed at least predetermined times, and outputting the fixed recognition result.

8 Claims, 13 Drawing Sheets

(51) Int. Cl.
 *G06K 9/34* (2006.01)
 *G06K 9/22* (2006.01)
 *G06K 9/72* (2006.01)
 *H04N 1/00* (2006.01)

(56) References Cited

U.S. PATENT DOCUMENTS 7,840,033 B2 * 11/2010 Kurzweil et al. ............. 382/114
8,249,309 B2 * 8/2012 Kurzweil et al. ............. 382/114
8,676,273 B1 * 3/2014 Fujisaki ........................ 455/567
8,873,890 B2 * 10/2014 Kurzweil et al. ............. 382/301
2006/0013483 A1 * 1/2006 Kurzweil et al. ............. 382/176
2006/0017752 A1 * 1/2006 Kurzweil et al. ............. 345/698
2010/0231733 A1 9/2010 Dobashi et al.
2014/0267435 A1 * 9/2014 Choe et al. .................... 345/660

FOREIGN PATENT DOCUMENTS

JP 2009-88944 A 4/2009
JP 2010-218061 A 9/2010

* cited by examiner

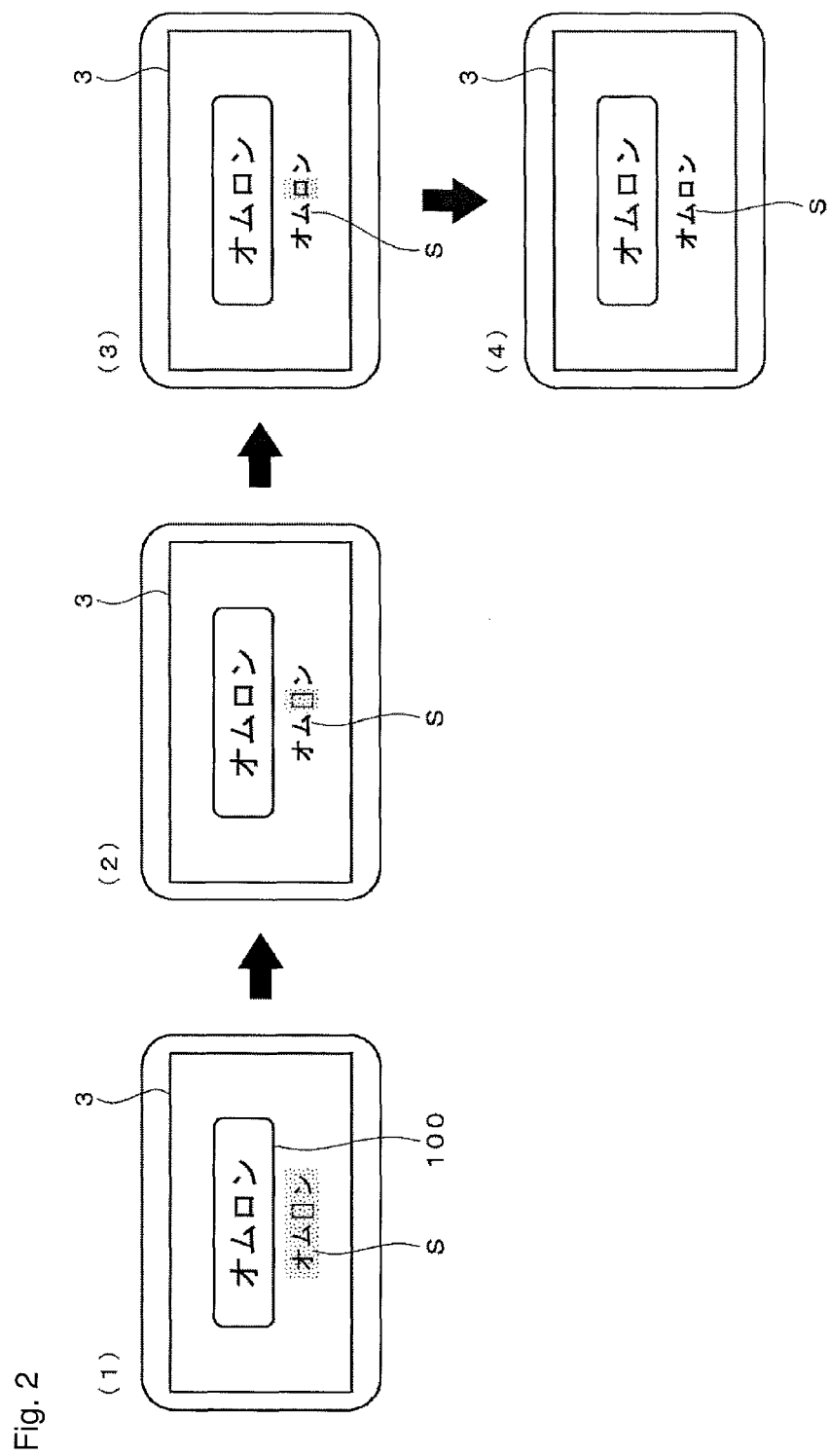

Fig. 3

| Time | Recognition result of whole character string | Reliability of third character | Output result of third character | Criterion for output |
|---|---|---|---|---|
| 1 | オムロン | 45 | [] | Output of initial recognition result |
| 2 | オムロン | 60 | ロ | Output of recognition result having higher reliability |
| 3 | オムロン | 65 | ロ | Output of recognition result having the larger number of appearance times |
| 4 | オムロン | 60 | ロ | |
| 5 | オムロン | 70 | ロ | Fixed output of recognition result having appearance ratio larger than 80% |
| 6 | オムロン | 30 | ロ | |

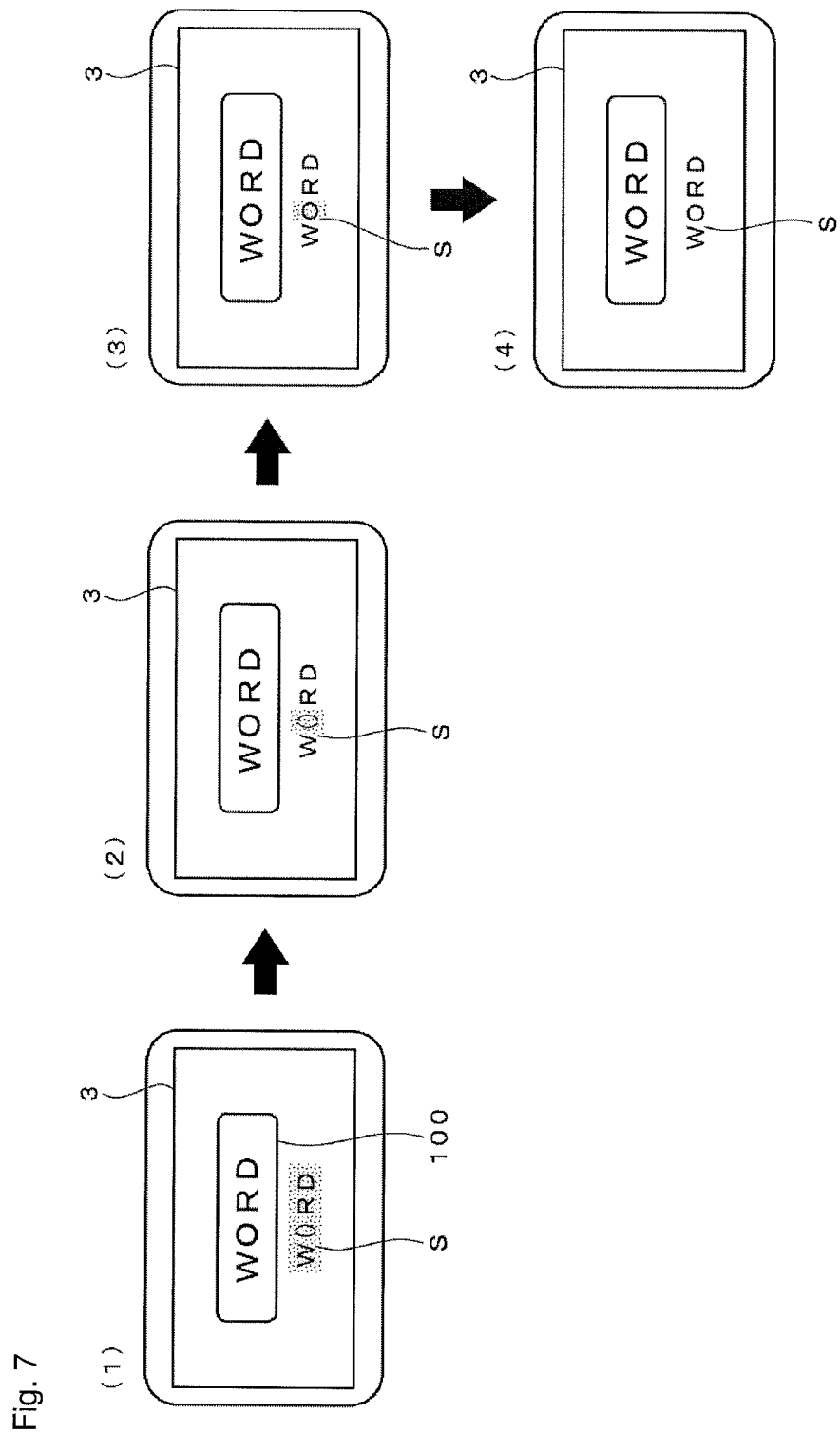

Fig. 8

| Time | Recognition result of whole character string | Degree of reliability of second character | Output result of second character | Criterion for output |
|---|---|---|---|---|
| 1 | W()RD | 4 5 | ( ) | Output of initial recognition result |
| 2 | WORD | 6 0 | O | Output of recognition result having higher reliability |
| 3 | WORD | 6 5 | O | Output of recognition result having the larger number of appearance times |
| 4 | WORD | 6 0 | O | |
| 5 | WORD | 7 0 | O | Fixed output of recognition result having appearance ratio larger than 80% |
| 6 | W()RD | 3 0 | O | |

PROGRAM FOR READING CHARACTERS, AND CHARACTER READER AS WELL AS METHOD FOR READING CHARACTERS

BACKGROUND

1. Technical Field

The present invention relates to a technology for processing a moving image, which is generated by photographing a character string, to read characters in the moving image.

2. Related Art

As to an OCR application incorporated in an information processing device, such as a mobile phone, which has a moving image photographing function, there is well known an OCR application that selects a frame suitable for recognition processing while processing the moving image of the character string in units of frames, and outputs the character string read from the image of the selected frame.

For example, in the description of Patent Document 1, a change to the previously-captured image is extracted every time the image is captured, character recognition processing is performed using the image in which the extracted change amount becomes lower than or equal to a predetermined permissible value, and a recognition result is output under the condition that a degree of similarity of a recognition target image to a character model determined to correspond to the recognition target character string in the character recognition processing is greater than a predetermined reference value (see Paragraph Nos. 0025 to 0046, FIG. 4, and the like of Patent Document 1).

In the description of Patent Document 2, an evaluation value is obtained to determine whether every frame image is suitable for the character recognition, and the character recognition processing is performed when the frame in which the evaluation value is greater than a threshold is discovered, or the character recognition processing is performed using the frame image in which the maximum evaluation value is obtained. The evaluation value is calculated from parameters such as a shutter speed, an aperture value, and contrast (see Paragraph Nos. 0027 to 0042 and the like of Patent Document 2).

Patent Document 1: Japanese Unexamined Patent Publication No. 2008-250818
Patent Document 2: Japanese Unexamined Patent Publication No. 2009-88944

SUMMARY

As described in Paragraph No. 0042 of Patent Document 1, in the general character reading processing, after the character in the image is individually extracted by projection processing, each character is matched against a plurality of types of character image models (hereinafter referred to as "character models"), and the character indicated by the character model in which the degree of similarity having at least a predetermined value is obtained is determined to be the corresponding character. The degree of similarity to the character model used in the determination is set as a degree of reliability of the recognition result.

However, there is a possibility of generating false recognition due to a blurred character or a lighting variation. Therefore, there has been developed a technology for analyzing whether the character string constructed based on the recognition result in units of characters holds true as a word, and for correcting the character string that does not hold true as a word. FIGS. 12(1), 12(2) and 13 illustrate specific examples. FIGS. 12(1) and 12(2) illustrate examples that are corrected by performing matching processing of a character type between the recognized characters.

Specifically, in the example of FIG. 12(1), a second character "タ (ta)" is falsely recognized as a kanji character "夕 (yuu)" in reading a Japanese katakana character string "カタカナ". In this case, because all of the remaining characters are katakana characters, it is determined that the recognition target character string has the high possibility of the katakana character string, and the second character "夕 (yuu)" is replaced with the katakana character "タ (ta)" similar to "夕 (yuu)".

In the example of FIG. 12(2), each of the second and trailing characters "O" is falsely recognized as a numerical character "0" in reading an alphabetical character string "TOKYO". In this case, because all of the remaining characters are alphabetical characters, it is determined that the recognition target character string has the high possibility of the alphabetical character string, and the two characters determined to be "0" are replaced with the alphabetical character "O" similar to "0".

FIG. 13 illustrates a correction example performed by a method for searching a word dictionary using the character string constructed by the recognized characters. Every character constituting the character string, some candidate characters are extracted in the descending order of the degree of reliability obtained during the matching against the character model, and a plurality of combinations of the candidate characters are matched against the word dictionary. Referring to FIG. 13, in reading a kanji character string "文化" (means "culture"), a first candidate for the first character "文" is falsely recognized as "六", and "文" that is of the correct character becomes a second candidate. On the other hand, the second character "化" is correctly recognized as the first candidate. While a character string "六化" constructed by the combination of the first candidates does not exist in the word dictionary, the character string "文化" constructed by the combination of the second candidate for the first character "文" and the first candidate for the second character "化" is registered in the word dictionary. Therefore, the character string of the latter combination is adopted as the recognition result.

Thus, sometimes the recognition result can be corrected by the analysis of the character type or the matching processing against the word dictionary. However, sometimes the correction cannot be performed by these methods. FIGS. 14(1) and 14(2) illustrate such examples.

In the example of FIG. 14(1), the third character "ロ" in a Japanese katakana character string "オムロン" (Japanese notation of "omron") is extracted while separated right and left, and recognized as a pair of square brackets "[ ]". In the example of FIG. 14(2), the second character "O" in an alphabetical character string "WORD" is similarly extracted while separated right and left, and recognized as a pair of parentheses "( )".

In the examples of FIGS. 14(1) and 14(2), it is falsely recognized that the pair of parentheses is used without interposing the character therebetween. Because the parentheses are possibly used in the form, it is determined that there is no grammatical defect, and probably the result of the false recognition is output with no correction.

In Patent Documents 1 and 2, the image suitable for the recognition is selected using the moving image photographing function, an imaging unit is properly positioned to the recognition target character string, and the character recognition processing is performed using the image having image quality suitable for the recognition. However, the adopted recognition result is obtained from the processing performed to the one frame image, and there is no suggestion for coping with an error of the recognition result.

One or more embodiments of the present invention considerably enhances accuracy of the reading processing using the moving image that is generated while the imaging unit is positioned to the recognition target character string.

A character reading program according to one or more embodiments of the present invention is configured to cause a computer connected to an imaging unit having a moving image photographing function to act as a character reader, a moving image generated by photographing a character string with the imaging unit being input to the character reader, the character reader reading a character in the moving image.

A recognition processor configured to repeat processing of recognizing the character included in one-frame image input latest in parallel to input of the moving image; a fixing unit configured to perform matching of a recognition result of the recognition processor in units of characters along a time axis and to fix the recognition result appearing with an appearance ratio larger than a reference value previously decided in the recognition processing continuously performed at least predetermined times; and an output unit configured to output the recognition result fixed by the fixing unit are provided in the character reader.

According to the above configuration, while the photographing is performed with the imaging unit positioned to the recognition target character string, the character recognition processing is repeatedly performed to the frame-unit image, and the matching of every recognition result is performed in units of characters. The recognition result appearing with the appearance ratio larger than the reference value is adopted while the recognition processing is repeated at least predetermined times.

Therefore, even if the character in which at least two recognition results different from each other are obtained exist while the recognition processing is performed a plurality of times, the recognition result repeated with the sufficient times is adopted in the recognition results, so that a ratio at which the false recognition is generated can considerably be reduced.

In a first embodiment of the above character reader, the fixing unit tentatively fixes the recognition result having the largest number of appearance times with respect to the character in which the recognition result having the appearance ratio greater than the reference value is not obtained, and the output unit outputs data for displaying the character of the fixed recognition result and the character of the tentatively-fixed recognition result in different forms.

In a second embodiment of the above character reader, the fixing unit tentatively fixes the recognition result having the highest degree of reliability with respect to the character in which the recognition result having the appearance ratio greater than the reference value is not obtained, and the output unit outputs data for displaying the character of the fixed recognition result and the character of the tentatively-fixed recognition result in different forms.

According to the first and second embodiments, the fixed character and the tentatively-fixed character are displayed in different forms while the recognition processing is performed in parallel with the photographing of the character string. Even in the character that is displayed while tentatively fixed, the display form changes when the recognition result is fixed. Therefore, a user continuously performs the reading without moving the imaging unit until all the displayed characters are displayed while fixed, whereby the recognition result can be obtained with high accuracy.

The data output from the output unit can be used for the purpose other than the display. For example, text data of the recognized character string is produced, and the text data can be input to another application executed by the computer. In this case, the text data may be output from the character reader or the text data may be output by a function of a device in which the character reader is incorporated.

In the application that receives the input of the text data, the input text data is translated into another language, and a translation result may be output. The translation application and the character reader application are not divided, but one application including both the translation application and the character reader application may be incorporated in the computer.

The character reader according to the first and second embodiments further includes a correction unit configured to correct the character by receiving operation to assign the character displayed by the data output from the output unit and operation to correct the assigned character. The correction unit can easily perform the correction even if the false recognition is generated in a part of the character string.

A character reading method according to one or more embodiments of the present invention is performed by a computer connected to an imaging unit, and the character reading method includes: repeating processing of recognizing the character included in one-frame image input latest in parallel to input of the moving image; performing matching of a recognition result obtained by every piece of recognition processing in units of characters along a time axis; fixing the recognition result appearing with an appearance ratio larger than a reference value previously decided in the recognition processing continuously performed at least predetermined times; and outputting the fixed recognition result.

The character reading method can be performed by the computer provided in a casing different from the imaging unit in addition to the computer provided in a casing in which the imaging unit is incorporated.

According to one or more embodiments of the invention, the recognition processing is repeatedly performed while the moving image of the recognition target character string is photographed, and the character in which the appearance ratio greater than the reference value in the recognition processing performed at least predetermined times is adopted in each character, so that a frequency at which the false recognition result is fixed can be reduced. Therefore, the character reading accuracy is considerably enhanced.

BRIEF DESCRIPTION OF THE DRAWINGS

FIG. 2 is a view illustrating a first example of a transition of a display screen for a recognition result.

FIG. 3 illustrates an example of a table in which a degree of reliability of the recognition result, an output result, and a criterion for a falsely-recognized character correspond to the transition of the recognition result.

FIG. 7 is a view illustrating a second example of the transition of the display screen for the recognition result.

FIG. 8 illustrates a second example of the table in which the degree of reliability of the recognition result, the output result, and the criterion for the falsely-recognized character correspond to the transition of the recognition result.

DETAILED DESCRIPTION

Figure 1:
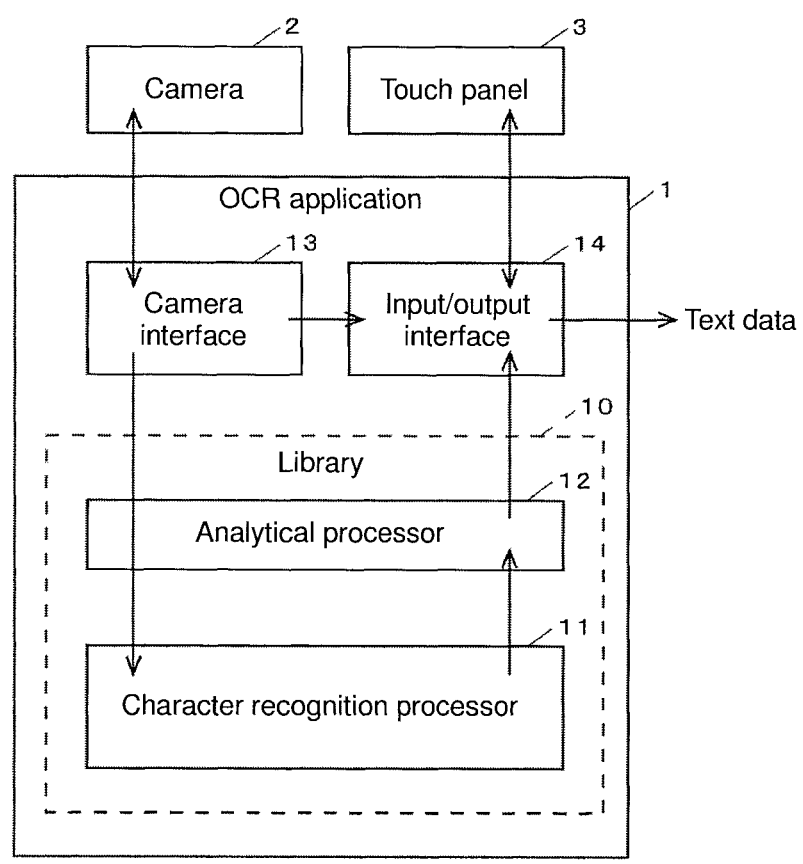
FIG. 1 is a functional block diagram of an OCR application to which one or more embodiments of the present invention is applied.

Embodiments of the present invention will be described with referenced to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a functional block diagram illustrating a configuration example of OCR application 1 incorporated in a mobile information processing device.

A smartphone is a specific form of the information processing device of one or more embodiments of the present invention. The information processing device including camera 2 having a moving image photographing function and touch panel 3 in which a display unit and an operation unit are integrated with each other. OCR application 1 includes camera interface 13, input/output interface 14, and library 10 (a program group having a character reading function) that causes a controller of the smartphone to act as a character reader.

In one or more embodiments of the present invention, library 10 includes functions of character recognition processor 11 and analytical processor 12.

Camera interface 13 causes camera 2 to start moving image photographing in response to start-up of OCR application 1, and captures a frame image every time. The captured image is provided to input/output interface 14 and character recognition processor 11.

Character recognition processor 11 includes a dictionary (not illustrated) in which a plurality of types of character models are registered. Character recognition processor 11 recognizes a character code corresponding to each character by performing character cutout processing of extracting individual character in the image using an image projection processing technique, matching processing of matching the image of the extracted character against various character models in the dictionary, and the like to the frame image provided from camera interface 13. This recognition processing is repeatedly performed concurrently with input of the frame image.

Hereinafter, the recognition of the character code is simply referred to as "the character is recognized".

Analytical processor 12 performs the matching of every recognition result of character recognition processor 11 in units of characters along a time axis, and fixes the recognition result (character) every character according to a criterion to be described later. Input/output interface 14 displays the fixed recognition result on touch panel 3 together with the moving image provided from camera interface 13.

FIG. 2 illustrates an example of a screen displayed in touch panel 3.

In the example of FIG. 2, a katakana character string "オムロン" (Japanese notation of "omron") is photographed and the character recognition is performed. In FIG. 3, a recognition target character string is largely displayed in central frame 100, and character string S of the recognition result is displayed small below the recognition target character string. In one or more embodiments of the present invention, because the recognition processing is repeatedly performed, any character is displayed while tentatively fixed when the image is stabilized even in a stage in which the recognition result is not fixed. The tentatively-fixed character and the fixed character are displayed in different forms. For example, although actually the tentatively-fixed character or a background thereof is expressed by a highly bright color, the tentatively-fixed character is expressed by a halftone pattern in FIG. 2 instead of the color.

Referring to FIG. 2, initially all the characters are displayed in a tentatively-fixed state as illustrated in (1) of FIG. 2, and a display form changes in the character in which the recognition result is fixed after a while. In the example of (2) of FIG. 2, the display of the characters except the third character is changed to a fixed display. At this point, the third character is not recognized as the correct character "ロ" (ro), but falsely recognized as square brackets "[" and "]" while separated. When time elapses further, the correct recognition result is indicated as illustrated in (3) of FIG. 2. In the subsequent example of (4) of FIG. 2, "ロ" that is of the correct recognition result is fixed and displayed in the third character.

When determining that the recognition result is fixed by the display, a user calls an operation menu onto touch panel 3 to assign storage of the recognition result or output of the recognition result to another application as needed basis. In response to the assignment operation, input/output interface 14 outputs text data indicating the recognized character string to an assigned destination.

The change of the recognition result screen in FIG. 2 is generated in association with the processing performed by analytical processor 12.

In analytical processor 12 of one or more embodiments of the present invention, the recognition result having a correspondence relationship is counted every time the contents are matched with each other while character correspondence processing is performed to every recognition result in units of characters. The recognition result having the appearance ratio greater than 80% is fixed under the condition that the recognition processing is performed at least five times. The recognition result having the largest number of appearance times is tentatively fixed until the recognition result is fixed. In the case that a plurality of recognition results having the same number of appearance times are recognized, the recognition result having the highest degree of reliability is tentatively fixed.

As used herein, the degree of reliability means a degree of similarity of the character image that is extracted with respect to the character model specified as the character image when the character image extracted by the character cutout processing is matched against the character model. In the case that the plurality of recognition results exist, an average value or a representative value (a maximum value or a minimum value) of the degree of reliability of each recognition result is used as the degree of reliability.

FIG. 3 illustrates a transition of the recognition result of the whole character string by taking "オムロン" of the recognition target character string in FIG. 2 as an example, and also illustrates the degree of reliability of every recognition result, the character form output as the recognition result, and the criterion for the output which correspond to one another with respect to "ロ" of the third character in which the false recognition is generated.

In FIG. 3, for the sake of convenience, it is assumed that the recognition processing is performed six times without corresponding to the transition of the display in FIG. 2, and it is assumed that "ロ" of the third character is falsely recognized as "[ ]" for the first and sixth times.

The output of the recognition result for the third character will be described with reference to FIG. 3. Although the false recognition is generated in the recognition processing for the first time, the falsely-recognized character "[ ]" is directly output because the matching cannot be performed against the past recognition result.

In the recognition processing for the second time, the correct recognition result is obtained, and the number of correct recognition times and the number of false recognition times become one, thereby selecting the recognition result having the higher degree of reliability. In the example of FIG. 3, because the degree of reliability of the correct recognition for the second time becomes higher, the recognition result for the second time is used and "ロ" is output.

The correct recognition result is continuously obtained in the pieces of recognition processing for the third and fourth times. Therefore, "ロ" is output because the number of correct recognition times is larger than the number of false recognition times.

The correct recognition result is also obtained in the recognition processing for the fifth time. At this point, the five-time recognition processing necessary for the determination of the appearance ratio is completed, and the recognition result that the third character is "ロ" is obtained in four of the five pieces of recognition processing. That is, the appearance ratio of the recognition result that the third character is "ロ" reaches 80%. Therefore, the recognition result is fixed, and the output of "ロ" is maintained afterward. In the sixth recognition processing, the third character is falsely recognized again. However, the recognition result is fixed in the fifth recognition processing, and the result of the false recognition has no influence on the output.

Figure 4:
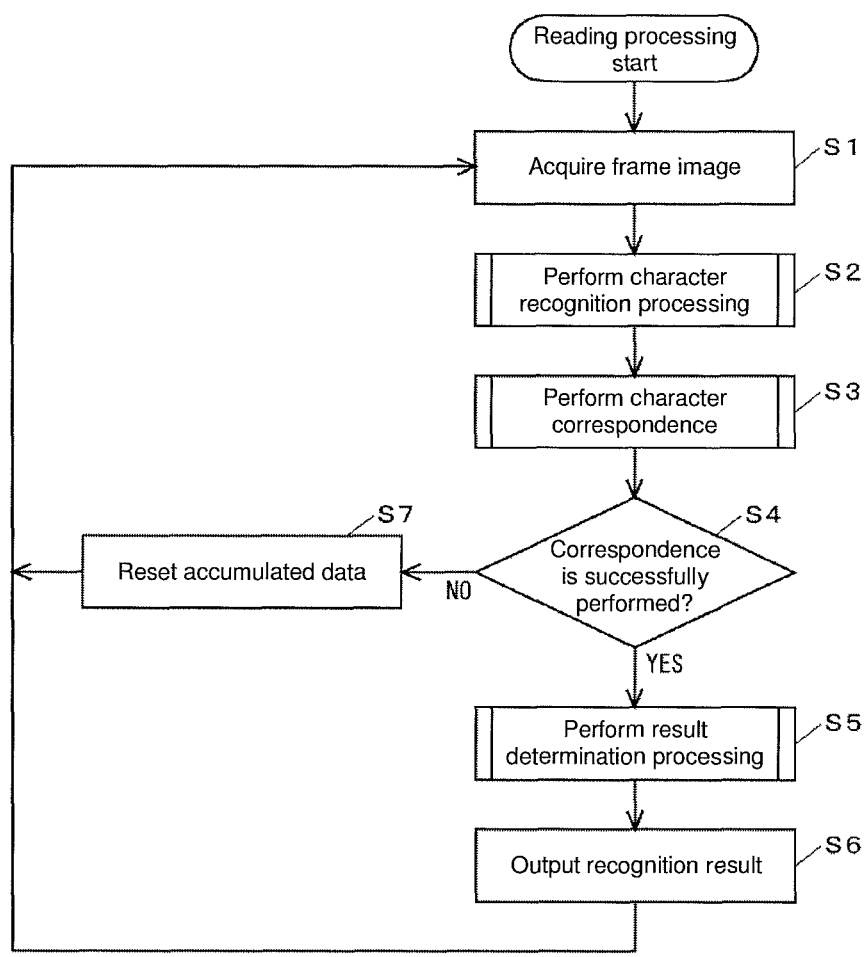
FIG. 4 is a flowchart illustrating a schematic procedure of processing in the OCR application.

FIG. 4 illustrates a series of procedures of the reading processing performed by OCR application 1.

The reading processing is started according to start of photographing with camera 2. Steps S1 and S2 correspond to the processing performed by character recognition processor 11, the latest frame image is acquired, and the character recognition processing is performed to the frame image.

Then the flow transitions to the processing performed by analytical processor 12. In step S3, the correspondence of the character recognized by the matching against the previous recognition result is performed. When the character correspondence is successfully performed ("YES" in step S4), the flow goes to step S5 to determine the recognition result that should be output based on the criterion. In step S6, a determination result is output through input/output interface 14.

When the flow of steps S1, S2, S3, S4, S5, and S6 is smoothly continued, every character recognition result, the correspondence result, the output data, and the like are accommodated in a buffer memory and used in the pieces of processing in steps S3 and S5. On the other hand, in the case of a failure in the character correspondence, the flow goes to step S7 from step S4 to reset the accumulated data.

A loop in FIG. 4 is repeated until operation to make a request to output the recognized character string or operation to end the application is performed. The latest frame image is acquired in step S1 of every loop, and the frame image is not continuously acquired in the case that a loop performing period is slower than a moving image generating cycle.

Figure 5:
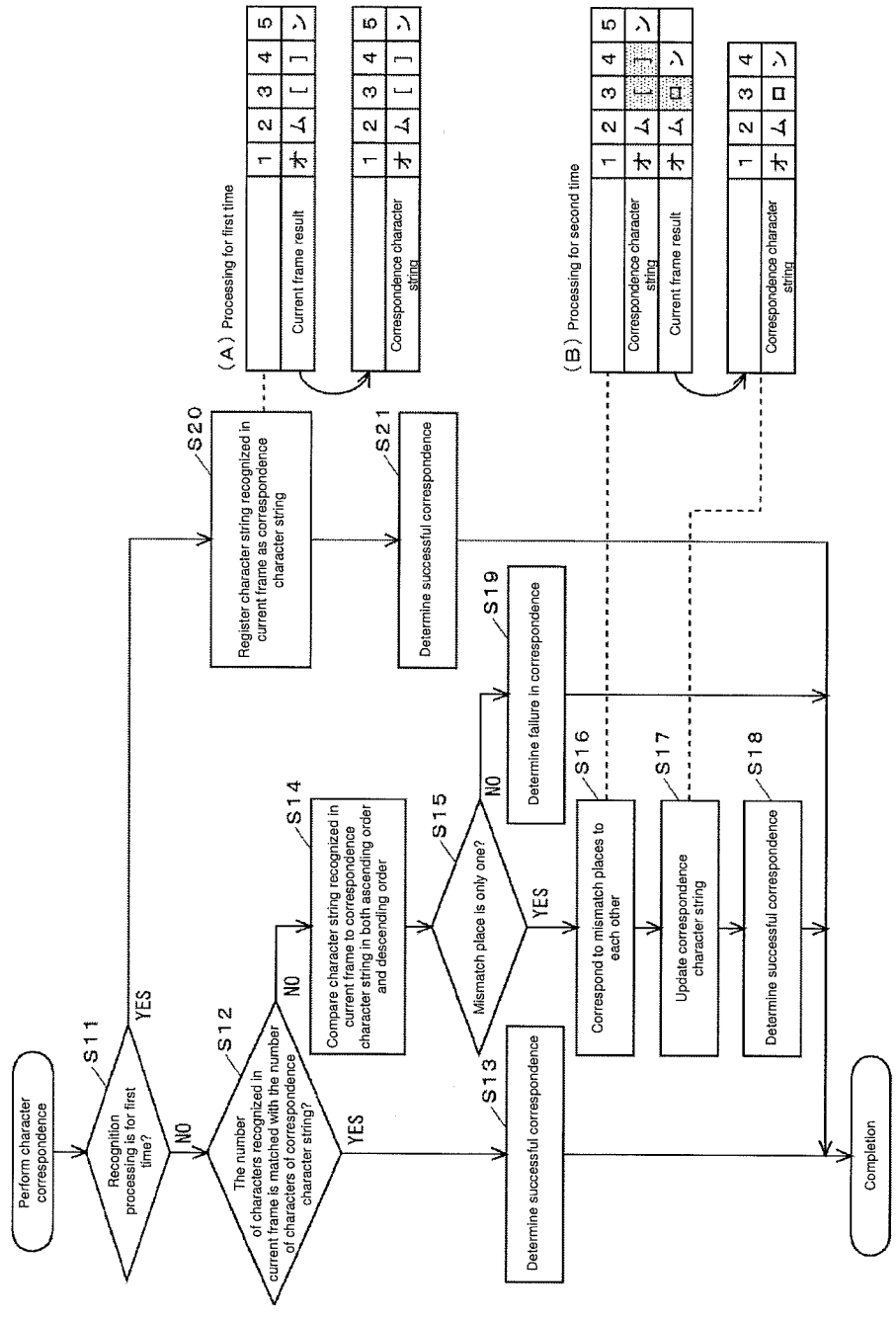
FIG. 5 is a flowchart illustrating a detailed procedure of character correspondence processing together with the corresponding example in FIG. 3.

FIG. 5 illustrates a detailed flow of the character correspondence processing in step S3 together with a specific example (corresponding to the example in FIG. 3) of the character correspondence processing. Hereinafter, the correspondence target frame is referred to as a "current frame".

For the first recognition processing ("YES" in step S11), the character string recognized in the current frame is registered as a basic character string (hereinafter referred to as a "correspondence character string") for the purpose of the later correspondence (step S20). It is determined that the correspondence is successfully performed, and the number of successful times is set to 1 (step S21).

For the second or later pieces of recognition processing ("NO" in step S11), the numbers of characters of the character string recognized in the current frame is compared to the number of characters of the correspondence character string (step S12). When the numbers of characters are matched with each other ("YES" in step S12), it is determined that the correspondence is successfully performed, the number of successful times is incremented by 1 (step S13).

When the numbers of characters of the character string recognized in the current frame differs from the number of characters of the correspondence character string ("NO" in step S12), the characters constituting the character string recognized in the current frame are sequentially compared to the characters of the correspondence character string one by one (step S14). In the comparison processing, the characters are compared to each other in both the order toward a tail end from a head (ascending order) and the order toward the head from the tail end (descending order), and whether a mismatch place is only one is determined based on the comparison results. At this point, when the mismatch place in the ascending order is matched with the mismatch place in the descending order, it is determined that the mismatch place is only one ("YES" in step S15). According to the determination, the mismatch places of the character strings correspond to each other (step S16), and the character string recognized in the current frame is set to the correspondence character string (step S17). It is determined that the correspondence is successfully performed, and the number of successful times is incremented by 1 (step S18).

On the other hand, when it is determined that at least two mismatch places exist ("NO" in step S15), it is determined the failure occurs in the correspondence (step S19).

(A) of FIG. 5 illustrates the character string recognized by the processing for the first time in FIG. 3. Because the third character is falsely recognized while separated into two, the character string consists of five characters, and the character string is set to the correspondence character string in step S20.

(B) of FIG. 5 illustrates a relationship between the character string recognized by the second processing in FIG. 3 and the correspondence character string. When the character strings are matched against each other in both the ascending order and the descending order in step S14, the first and second characters of both the character strings are matched with each other, and the fifth character of the correspondence character string is matched with the fourth character recognized in the current frame. However, it is found that the characters between the first and second characters and the fifth character in the corresponding character string are not matched with the character between the first and second characters and the fourth character in the current frame result (the third and fourth characters of the correspondence character string are not matched with the third character recognized in the current frame). Therefore, it is determined that the mismatch place between the character strings is one, and the character strings correspond to each other. At this point, the third and fourth characters of the character string recognized for the first time are put together into one set, and correspond to the third character of the character string recognized for the second time. The correspondence character string is updated to the character string recognized in the current frame.

A character correspondence result between the character strings is stored in a sequentially connected way. Accordingly, "[ ]" in the character string recognized for the first time is connected to "ロ" in the character string recognized for the second to fifth times. When it is determined that the correspondence is successfully performed (steps S13, S18, and S21), the number of successful times is counted.

Figure 6:
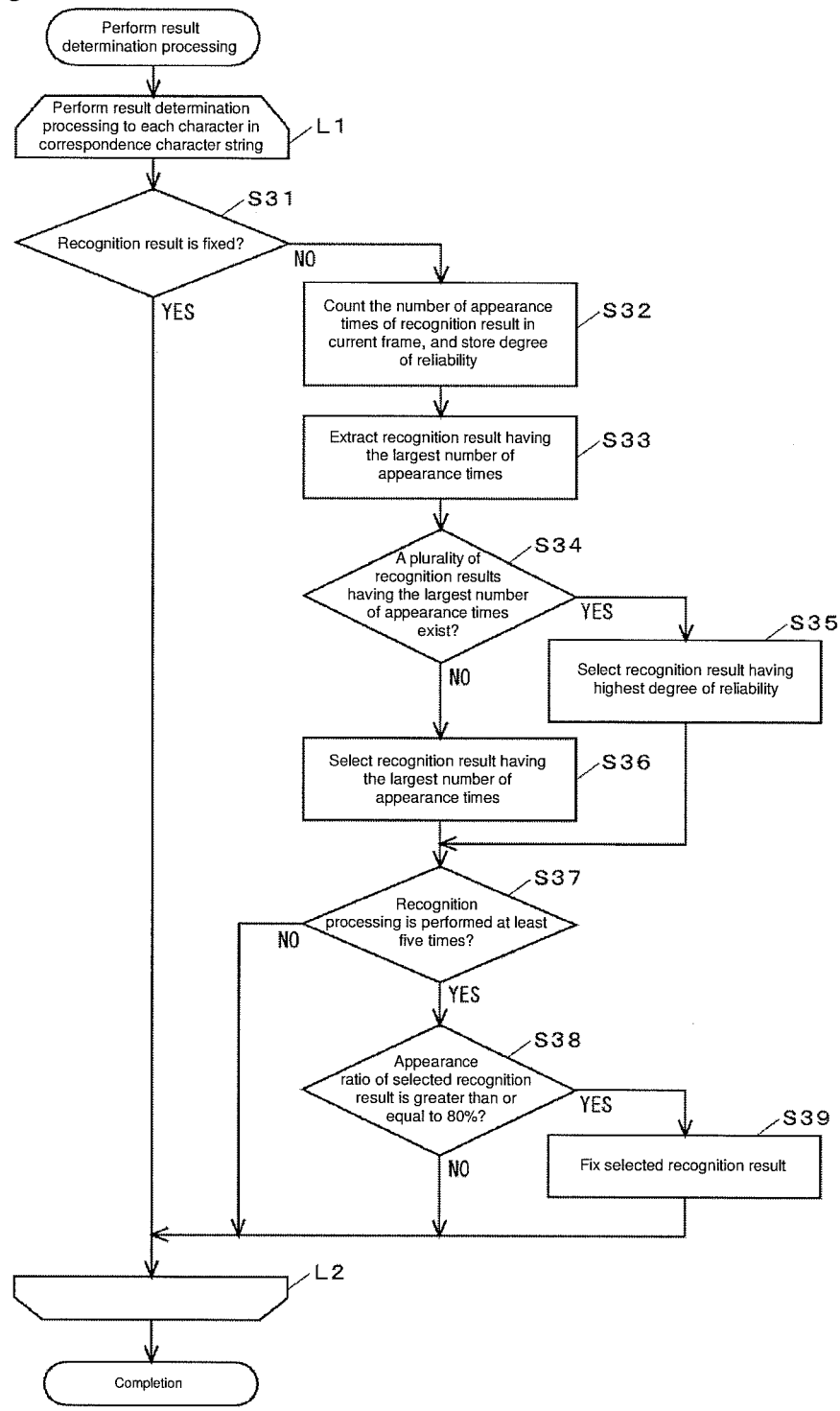
FIG. 6 is a flowchart illustrating a detailed procedure of result determination processing.

In the subsequent result determination processing (step S5 in FIG. 4), the output character is decided by analyzing the recognition result in each character of a correspondence group. FIG. 6 illustrates a detailed procedure of the result determination processing.

In the result determination processing of FIG. 6, attention is sequentially paid to the characters of the correspondence character string, and pieces of processing (steps S31 to S39) in loop symbols L1 and L2 are performed to each past recognition result that corresponds to the interested character.

Actually the substantial processing is performed only when the recognition result is not fixed for the interested character ("NO" in step S31). In step S32, a degree of reliability of the recognition result is stored while the number of appearance times of the recognition result is counted in the current frame corresponding to the interested character. In the counting processing, the number of appearance times is set to 1 in the case that the same recognition result does not exist in the past, and the number of appearance times is incremented by 1 in the case that the same recognition result is already obtained.

The recognition result having the largest number of appearance times is extracted based on the recognition result derived with respect to the interested character and the number of appearance times of the recognition result (step S33). When the plurality of recognition results are extracted ("YES" in step S34), the recognition result having the highest degree of reliability is selected (step S35). When only one recognition result is extracted ("NO" in step S34), the existing recognition result is selected (step S36).

In step S35, for the comparison target recognition result, an average of the degrees of reliability is obtained in each recognition results having the same content, and the recognition result corresponding to the highest average may be selected.

In step S37, whether the recognition processing of the interested character is continuously performed at least five times is checked based on the number of successful correspondence times. When the number of successful correspondence times is greater than or equal to 5, because the recognition processing of the interested character is performed at least five times to connect the recognition results, the affirmative determination is made in step S37. Whether the appearance ratio of the recognition result selected in step S35 or S36 is greater than or equal to 80% is checked in step S38. When the affirmative determination is made in step S38, the selected recognition result is fixed (step S39).

In the character in which the recognition result is fixed by the above procedure, the affirmative determination is made in step S31 by the next processing, and the fixed recognition result is maintained. In the character in which the negative determination is made in step S37 or S38, because the recognition result is not fixed, the procedures from step S32 are also performed next time.

In the case that the result determination processing is performed to the recognition result in FIG. 3, the square brackets "[" and "]" that are falsely recognized as the third and fourth characters are selected as "the recognition result having the largest number of appearance times" only for the first time, and the correct recognition result is selected for all the remaining times. Accordingly, for the characters "オ", "ム", and "ン" correctly recognized every time and the third character "ロ" falsely recognized for the first time, the affirmative determination is made in steps S37 and S38 in the fifth recognition processing, and the correct recognition result is fixed.

The reading processing procedure in FIGS. 4, 5, and 6 can also be applied to not only the Japanese character string but also the character strings of other languages. FIG. 7 illustrates an example of a change of the recognition result screen in the case that the reading processing is performed with the alphabetical character string "WORD" as the recognition target character string. Similarly to the example in FIG. 2, the recognition target character string is largely indicated in central frame 100, and character string S of the recognition result is displayed small below the recognition target character string. In character string S of the recognition result, the fixed character and the tentatively-fixed character (expressed by the halftone pattern) are displayed in different forms.

In the example of FIG. 7, initially all the characters are displayed while tentatively fixed ((1) of FIG. 7), and the number of fixed characters increases gradually. In the four recognition target characters, the correct recognition is stably maintained for the characters except the second character "O", and the characters except the second character "O" is early fixed. On the other hand, sometimes the second character "O" is falsely recognized while separated into the parentheses "(" and ")", the second character "O" is fixed after an unfixed display period longer than that of other characters.

Figure 9:
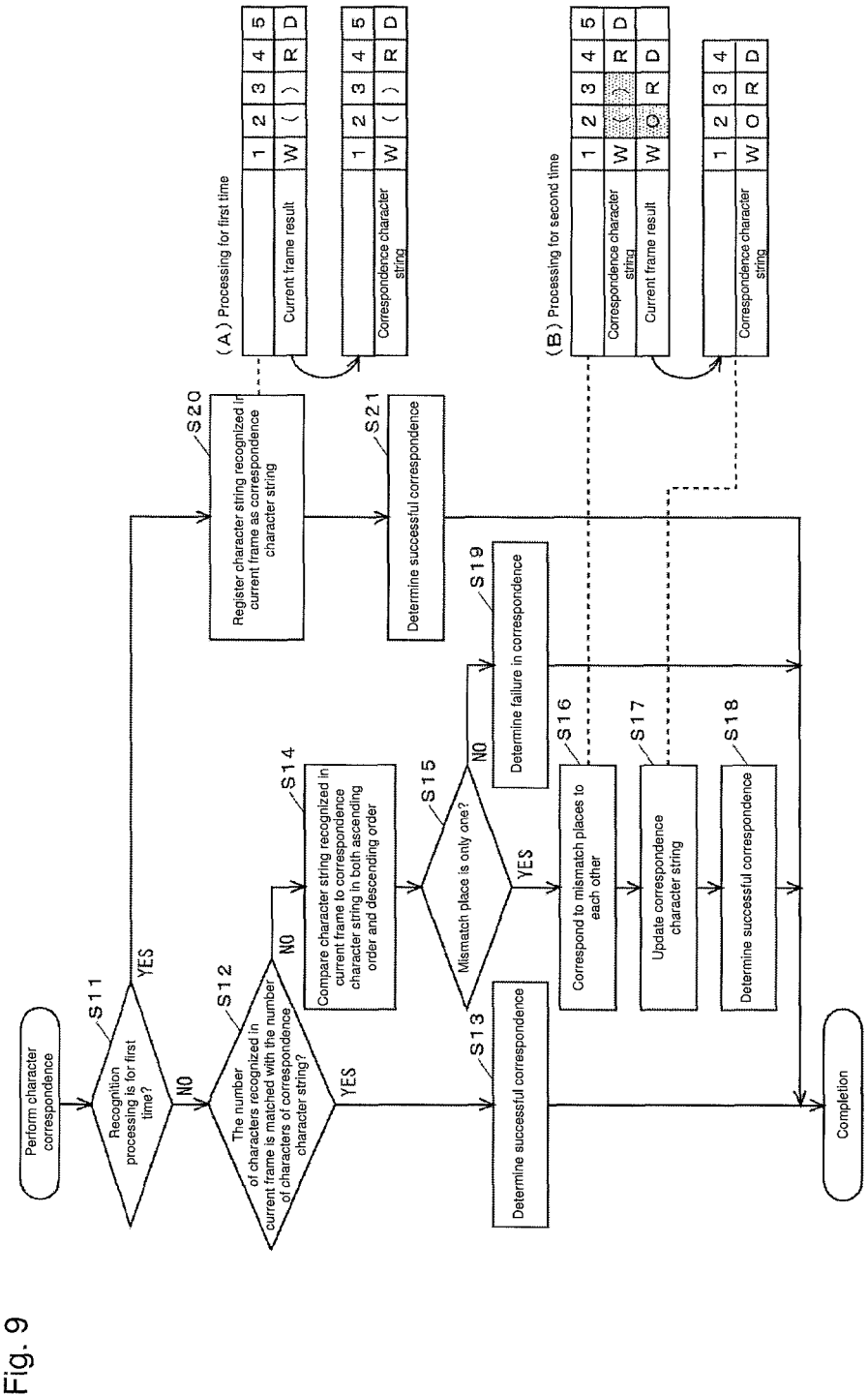
FIG. 9 is a flowchart illustrating a detailed procedure of character correspondence processing together with the correspondence example in FIG. 7.

FIG. 8 illustrates a transition of the recognition result of the whole character string by taking the recognition target character string "WORD" as an example (is not matched with the example in FIG. 7), and also illustrates the degree of reliability of every recognition result, the character form output as the recognition result, and the criterion for the output correspond to one another with respect to the second character "O" in which the false recognition is generated. FIG. 9 illustrates an example in which the character correspondence processing (the procedure is identical to that in FIG. 5) performed in each piece of recognition processing corresponds to the recognition results for the first and second times in FIG. 7.

The correspondence processing and result determination processing performed to the recognition target character string "WORD" will be described with reference FIGS. 6, 8, and 9.

Referring to FIG. 8, while "W", "R", and "D" in the recognition target character string are correctly recognized every time, the second character "O" is falsely recognized as the parentheses "(" and ")" in the pieces of processing for the first and sixth times.

Since the correspondence target character string does not exist in the recognition processing for the first time, the affirmative determination is made in step S11 of the correspondence processing in FIG. 9, and steps S20 and S21 are performed. Therefore, as illustrated in (A) of FIG. 9, the character string consisting of five characters including the falsely-recognized pair of parentheses is registered as the correspondence character string.

In the second recognition processing, although the whole character string is correctly recognized, because the number of characters of the character string is not matched with the number of characters of the correspondence character string including the falsely-recognized character, the negative determination is made in step S12, and the comparison processing is performed in step S14. As a result, it is determined that the number of mismatch places is only one, the affirmative determination is made in step S15, the correspondence of the mismatch place is performed in step S16, and the correspondence character string is updated to "WORD" in step S17 (see (B) of FIG. 9). At this point, the second and third characters of the recognition target character string for the first time are put together into one set, and correspond to the second character of the recognition target character string for the second time.

Because the whole character string is correctly recognized in the subsequent pieces of recognition processing for the third to fifth times, the affirmative determination is made in step S12 of the character correspondence processing, and the correspondence character string in (B) of FIG. 9 is maintained.

In the result determination processing (see FIG. 6) performed to every recognition result, although the parentheses "(" and ")" falsely recognized as the second and third characters are selected as "the recognition result having the largest number of appearance times" (step S36)) only for the first time, the correct recognition result is selected for the remaining times. Accordingly, the affirmative determination is made in steps S37 and S38 of the recognition processing for the fifth time with respect to all the characters, and the correct recognition result is fixed.

Additionally, there is a possibility of generating various pieces of false recognition such as confusion of the alphabetical character "O" with the numerical character "0", confusion of the alphabetical character "U" with the alphabetical character "V", and confusion of the numerical character "1" with the alphabetical character "I" and a lower-case character "l" of the alphabetical character "L". In any case, the accuracy of the recognition result can be enhanced by the reading processing in FIGS. 4, 5, and 6.

In the result determination processing in FIG. 6, the condition that the appearance ratio becomes 80% or more in the pieces of recognition processing performed at least five times is used in the fixedness. The number of recognition processing times (five times) and the appearance ratio (80%), which defines the condition, can properly be changed.

In one or more embodiments of the present invention, the recognition result having the largest number of appearance times is tentatively fixed until the condition is satisfied, and the selection is performed based on the degree of reliability in the case that the plurality of recognition results having the largest number of appearance times exist. Alternatively, the degree of reliability may preferentially be selected compared with the number of appearance times at the tentative fixedness stage. The recognition result in which appearance ratio becomes 80% or more in the pieces of recognition processing performed at least five times is not unconditionally fixed, the average value of the degrees of reliability of the recognition results is obtained, and the recognition result may be fixed under the condition that the average value of the degrees of reliability is greater than a predetermined reference value.

At the beginning of the photographing of the recognition target character string, there is a high possibility that the correspondence is not established because the image is not stabilized. However, when camera 2 is positioned to the recognition target character string to stabilize the image, the character correspondence is successfully performed to display the recognition result, and the recognition result is fixed in the character in the descending order of a frequency at which every recognition result is matched. Even in the character in which the false recognition is frequently generated, the recognition result is fixed when the recognition processing is performed predetermined' times or more to obtain the recognition result having the appearance ratio larger than 80%, so that a possibility of adopting the false recognition result can considerably be reduced.

The character in which the recognition result is fixed and the character in which the recognition result is not fixed yet are displayed in the different forms, so that the user can be notified that the photographing should be continued without moving camera 2 when the error exists in the tentatively-fixed character. Using the two types of display, the user can easily confirm the transition of the recognition result and the correct or false recognition result.

In one or more embodiments of the present invention, a function of receiving operation to select the character displayed on touch panel 3 or operation to correct the character and of correcting the character can be provided in OCR application 1.

Figure 10:
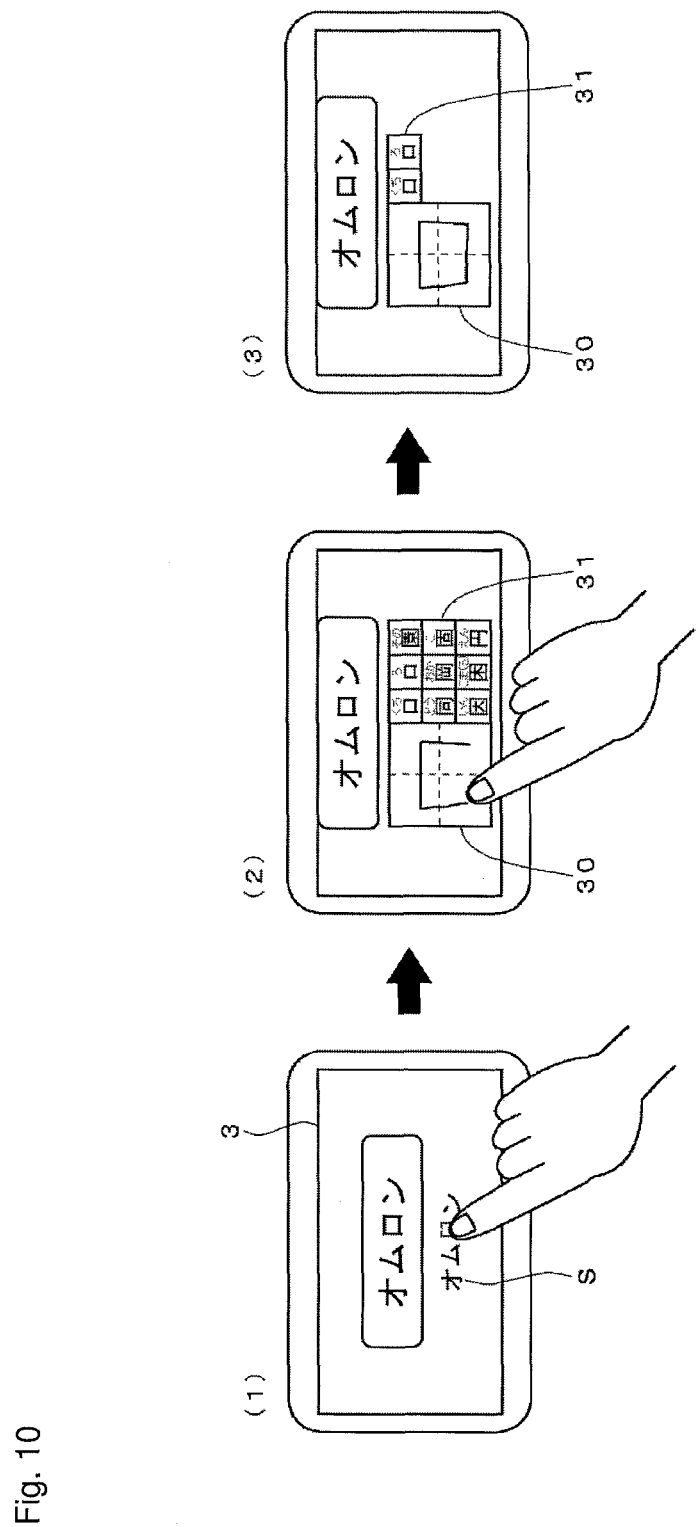
FIG. 10 is a view illustrating an example of a screen on which an error of the recognition result is corrected.

FIG. 10 illustrates an example in which the character (the falsely-recognized character "[ ]" for the katakana character string "オムロン") falsely recognized in the Japanese character string reading processing is corrected using the correction function.

In the example of FIG. 10, in the case that the error exists in the recognized character string, the screen on which the recognition result is displayed is maintained even after the photographing, and the falsely-recognized character is tapped ((1) of FIG. 10). As illustrated in (2) of FIG. 10, input field 30 for a handwriting character is displayed in the screen by the tap operation. When the user draws the character in input field 30, list 31 of candidates of the character suitable for the drawing of the user is displayed beside input field 30. As illustrated in (3) of FIG. 10, the user continues the drawing to narrow the candidates in list 31, and selects the candidate in list 31 at a given time point to input the correct character. The selected character is corrected by the input.

Figure 11:
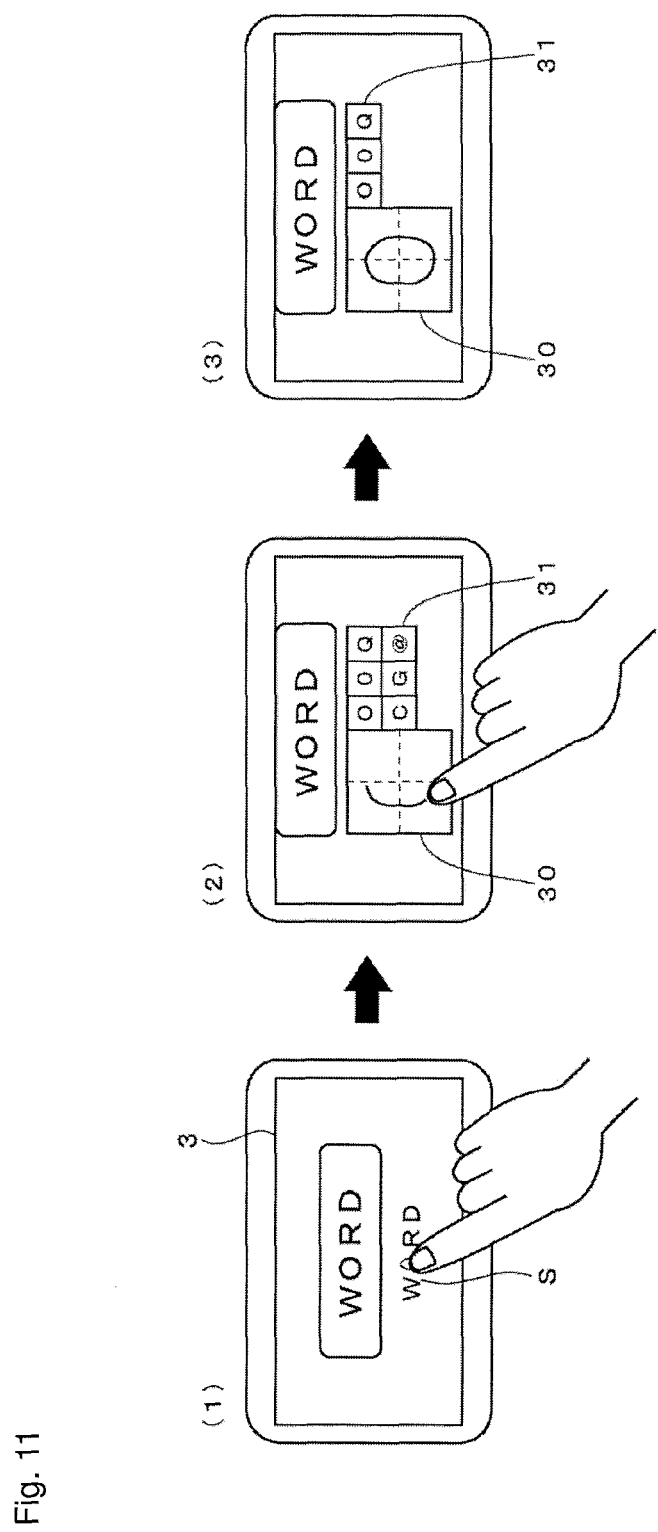
FIG. 11 is a view illustrating another example of the screen on which the error of the recognition result is corrected.
Figure 12:
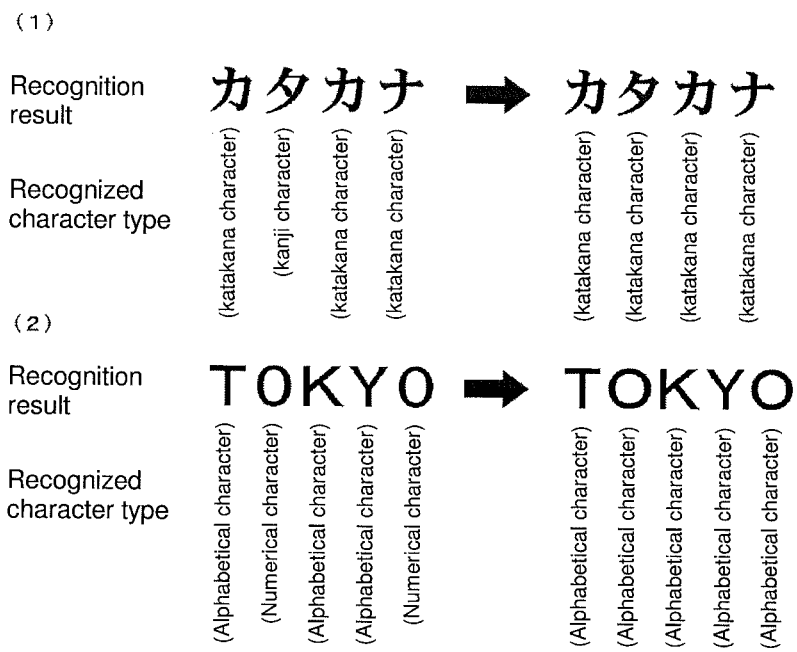
FIGS. 12(1) and 12(2) are views illustrating examples of a method for correcting the error of the recognition result.
Figure 13:
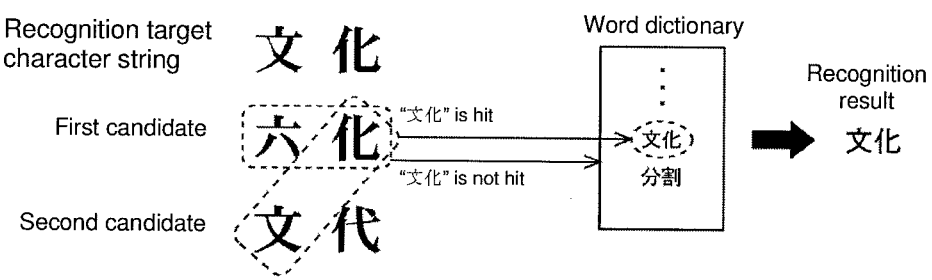
FIG. 13 is a view illustrating another example of a method for correcting the error of the recognition result.
Figure 14:
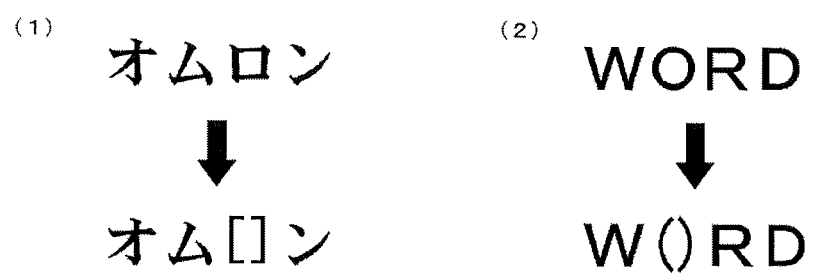
FIGS. 14(1) and 14(2) are views illustrating examples of false recognition that cannot be corrected by the methods in FIGS. 12(1), 12(2) and 13.

FIG. 11 illustrates an example in which the character (the falsely-recognized character "( )" for the English word "WORD") falsely recognized in the alphabetical character string reading processing is corrected using the correction function similar to that in FIG. 10. In the correction, similarly to the example in FIG. 10, input field 30 for the handwriting character is displayed in response to the tap operation, and list 31 of candidates is displayed in response to the character drawing operation in input field 30. As illustrated in (2) and (3) of FIG. 11, the candidates in list 31 are narrowed with the progress of the drawing work performed by the user.

The correction function can be used to fix the character in which the recognition result is hardly fixed in addition to the correction of the character fixed by the false recognition result.

The character input operation for the correction is not limited to the handwriting, but the character to be corrected may be input using a function of an input method editor (IME).

In one or more embodiments of the present invention, OCR application 1 is incorporated in the smartphone. Additionally, the OCR application having the similar function can be incorporated in a mobile phone except the smartphone, an information processing device (such as a digital video camera) having no communication function, and an information processing device (for example, a personal computer) connected to a general-purpose digital video camera.

The output of the result read by OCR application 1 is not limited to the output displayed on touch panel 3, but the result can be registered in an address book, and output to various applications such as a writing pad and a translation application.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS

1 OCR application
2 Camera
3 Touch panel
10 Library (program group for character reader)
11 Character recognition processor
12 Analytical processor
13 Camera interface
14 Input/output interface
30 Input field
31 Candidate list
S Character string of recognition result

The invention claimed is:

1. A character reading program stored on a non-transitory computer-readable medium that causes a computer connected to an imaging unit comprising a moving image photographing function to act as a character reader, a moving image generated by photographing a character string with the imaging unit being input to the character reader, the character reader reading a character in the moving image, the character reading program causing the computer to perform:
  repeating processing of recognizing the character included in one-frame image input latest in parallel to input of the moving image;
  matching of a recognition result in units of characters along a time axis and to fix the recognition result appearing with an appearance ratio larger than a reference value previously decided in the recognition processing continuously performed at least predetermined times; and
  outputting the fixed recognition result.

2. The character reading program stored on the non-transitory computer-readable medium according to claim 1, wherein the character reading program causes the computer to further perform:
  tentatively fixing the recognition result comprising the largest number of appearance times with respect to the character in which the recognition result comprising the appearance ratio greater than the reference value is not obtained, and
  outputting data for displaying the character of the fixed recognition result and the character of the tentatively-fixed recognition result in different forms.

3. The character reading program stored on the non-transitory computer-readable medium according to claim 2, wherein the character reading program causes the computer to further perform:
  correcting the character by receiving operation to assign the character displayed by the data output and operation to correct the assigned character.

4. The character reading program stored on the non-transitory computer-readable medium according to claim 2, wherein the character reading program causes the computer to further perform:
  tentatively fixing the recognition result comprising the highest degree of reliability with respect to the character in which the recognition result comprising the appearance ratio greater than the reference value is not obtained, and
  outputting data for displaying the character of the fixed recognition result and the character of the tentatively-fixed recognition result in different forms.

5. The character reading program stored on the non-transitory computer-readable medium according to claim 1, wherein the character reading program causes the computer to further perform:
  tentatively fixing the recognition result comprising the highest degree of reliability with respect to the character in which the recognition result comprising the appearance ratio greater than the reference value is not obtained, and
  outputting data for displaying the character of the fixed recognition result and the character of the tentatively-fixed recognition result in different forms.

6. The character reading program stored on the non-transitory computer-readable medium according to claim 5, wherein the character reading program causes the computer to further perform:
  correcting the character by receiving operation to assign the character displayed by the data output and operation to correct the assigned character.

7. A character reader configured to read a character, a moving image generated by photographing a character string with an imaging unit comprising a moving image photographing function being input to the character reader, the character reader reading a character in the moving image, the character reader comprising:
  a recognition processor that repeats processing of recognizing the character included in one-frame image input latest in parallel to input of the moving image;
  a fixing unit that performs matching of a recognition result of the recognition processor in units of characters along a time axis and to fix the recognition result appearing with an appearance ratio larger than a reference value previously decided in the recognition processing continuously performed at least predetermined times; and
  an output unit configured to output the recognition result fixed by the fixing unit.

8. A character reading method performed by a computer connected to an imaging unit, the character reading method comprising:
  repeating processing of recognizing the character included in one-frame image input latest in parallel to input of the moving image;

performing matching of a recognition result obtained by every piece of recognition processing in units of characters along a time axis;

fixing the recognition result appearing with an appearance ratio larger than a reference value previously decided in the recognition processing continuously performed at least predetermined times; and outputting the fixed recognition result.

\* \* \* \* \*